United States Patent
Fransson et al.

(10) Patent No.: US 10,569,968 B2
(45) Date of Patent: Feb. 25, 2020

(54) CONVEYOR BELT SCRAPER BLADE

(71) Applicant: SANDVIK INTELLECTUAL PROPERTY AB, Sandviken (SE)

(72) Inventors: Thomas Fransson, Trelleborg (SE); Mats Malmberg, Rydsgard (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/309,912

(22) PCT Filed: Jun. 17, 2016

(86) PCT No.: PCT/EP2016/064066
§ 371 (c)(1),
(2) Date: Dec. 13, 2018

(87) PCT Pub. No.: WO2017/215768
PCT Pub. Date: Dec. 21, 2017

(65) Prior Publication Data
US 2019/0248598 A1    Aug. 15, 2019

(51) Int. Cl.
B65G 45/12    (2006.01)
B65G 45/00    (2006.01)
B65G 45/10    (2006.01)
B65G 45/14    (2006.01)
B65G 45/16    (2006.01)

(52) U.S. Cl.
CPC .................................. *B65G 45/12* (2013.01)

(58) Field of Classification Search
None
See application file for complete search history.

(56) References Cited

U.S. PATENT DOCUMENTS

| 4,489,823 | A |  | 12/1984 | Gordon |
| 4,498,577 | A | * | 2/1985 | Veenhof ................ B65G 45/16 15/256.5 |
| 5,373,931 | A |  | 12/1994 | Barnes et al. |
| 6,349,816 | B1 |  | 2/2002 | Tenzer et al. |
| 6,354,428 | B1 |  | 3/2002 | Gibbs et al. |
| 7,007,794 | B2 | * | 3/2006 | Waters .................. B65G 45/12 198/497 |
| 9,630,782 | B2 | * | 4/2017 | Rolfsson ................ B65G 45/16 |
| 2016/0176649 | A1 | * | 6/2016 | Foley .................... B65G 47/72 198/497 |

FOREIGN PATENT DOCUMENTS

| DE | 29503929 U1 | 6/1995 |
| EP | 0338118 A1 | 10/1989 |
| EP | 1434725 B1 | 3/2008 |
| GB | 2221440 A | 2/1990 |

* cited by examiner

*Primary Examiner* — Kavel Singh
(74) *Attorney, Agent, or Firm* — Corinne R. Gorski (57) ABSTRACT

A conveyor belt scraper blade includes a scraper layer supported by a support unit. The support unit has a base and at least two support fingers projecting side-by-side from the base. The fingers are arranged to flex to and from contact with a conveyor belt so as to optimise the lifetime of the scraper and minimise damage to the belt.

15 Claims, 6 Drawing Sheets

FIG. 8

CONVEYOR BELT SCRAPER BLADE

RELATED APPLICATION DATA

This application is a § 371 National Stage Application of PCT International Application No. PCT/EP2016/064066 filed Jun. 17, 2016.

FIELD OF INVENTION

The present invention relates to a conveyor belt scraper blade having a scraper layer with a contact tip, the scraper layer supported by support fingers.

BACKGROUND ART

Conveyors find widespread application to transport bulk materials such as rock, sand, ores, crops, etc. A conveyor typically comprises a belt drivably mounted around a series of pulleys and drums to transport the material between locations. Belt cleaners (or scrapers) are advantageous to remove material adhered to the contact surface of the belt with such scrapers typically positioned at a region of a drive drum so as to clean the belt immediately after the conveyed material has been discharged.

Conventionally, conveyor belt scrapers have a contact tip that is biased against the material transport surface of the belt so as to continually wipe the belt surface as it is rotated around the drum. Accordingly, scrapers are wear parts and efforts have been directed to finding a balance between achieving sufficient contact and cleaning of the belt surface without damaging the belt. Example scrapers are described in EP 1434725; U.S. Pat. Nos. 5,373,931 and 6,349,816.

However, existing scrapers are not optimised with regard to scraping performance and service lifetime. In particular, conventional arrangements do not comprise sufficient flexibility so as to appropriately flex away from the belt in response to belt damage which only enhances the damage and accelerates wear of the scraper and the belt. Accordingly, what is required is a belt scraper that addresses these problems.

SUMMARY OF THE INVENTION

It is an objective of the present invention to provide a belt scraper having enhanced sensitivity to the contours of the belt so as to be capable of selectively flexing in response to damage or non-removable objects at the belt. It is a further objective to provide a scraper having the desired cleaning effectiveness during normal use whilst extending as far as possible the operational lifetime of the scraper and reducing or avoiding damage to the belt via the scraping contact.

The objectives are achieved by providing a scraper having a scraper layer that is supported in scraping contact with a conveyor belt via at least two support fingers extending in contact with the scraper layer along a length from a base to a tip. Advantageously, the material of the fingers comprises a hardness greater than that of the scraper layer so as to allow the scraper layer to be forced mechanically into engaging contact with the belt surface via a predetermined contact pressure. The fingers of the support component of the subject invention are capable of flexing in a direction away from the contact surface of the belt (perpendicular or transverse to the belt surface) dynamically in response to perturbations such as non-removable objects, adhered compacted material or damage to the belt (including regions that are cut, frayed, raised, rippled, creased, delaminated or are regions of the belt of increased thickness). By providing a scraper with flexible fingers, the scraping tip may be held in contact against the belt surface at one or a plurality of first regions whilst one or a plurality of second regions of the tip are capable of flexing away from the belt to relieve the contact pressure on the belt surface. The scraper is accordingly sensitive to the belt surface contours and may be fully or partially engaged in scraping contact with the belt. Flexible fingers are further advantageous to achieve an optimum balance between cleaning/scraping performance and extending the operational lifetime of the scraper layer as far as possible on the one hand and eliminating or reducing damage to the belt by the scraper on the other. This may be achieved firstly via the choice of material of the scraper layer and the flexible fingers and/or the configuration of the fingers being spaced apart along their length so as to be capable of flexing independently relative to a base part of the support. In particular, a scraping layer support component having flexible fingers allows the use of relatively softer material for the scraper layer that is advantageous to achieve the desired cleaning action with no or minimised damage to the conveyor surface.

According to a first aspect of the present invention there is provided a conveyor belt scraper blade comprising: a scraper layer having a tip to contact a surface of a conveyor belt; and a support to support the scraper layer; the scraper layer comprising a first material and the support comprising a second material having a hardness greater than the first material; characterised in that: the support comprises a base and at least two fingers projecting side-by-side from the base, the fingers extending in contact with the scraper layer along their length from the base to the tip.

Optionally, a thickness of the fingers in a plane perpendicular to the length of the fingers decreases from a base to a tip of the fingers. This provides the tip region of the fingers with greater flexibility (in a direction towards and away from the belt surface) relative to a base region of the fingers positioned at the base of the support. Optionally, a thickness of the scraper layer in a plane perpendicular to a length or width of the scraper layer (defined between a position at the base of the fingers to the tip of the scraper layer) is substantially uniform. Optionally, the thickness of the scraper layer may taper in the lengthwise direction between the base and the tip so as to increase or decrease from the base to the tip. Such a configuration may contribute to the desired flexibility of the scraper blade.

Reference within this specification to the scraper layer having a tip, encompass the tip having a contact edge or surface extending in a widthwise direction across the scraper layer being aligned generally perpendicular or transverse to a length or width of the scraper layer (as defined between a first end provided at the base and a second end provided at the tips of the fingers).

Preferably, the fingers are spaced apart in a widthwise direction to provide at least one gap region between the fingers. More preferably, the fingers are spaced apart in the widthwise direction along their full length such that the at least one gap region extends the full length of the fingers between the base and a tip of the fingers. The fingers of the present scraper blade are capable of flexing independently of one another towards and away from the belt surface dynamically in response to the contours or shape profile of the belt and belt surface. That is, the fingers of the support are not connected by additional brackets, braces or plates such that the tip regions of the fingers are spatially separated from one another by the gap regions. Preferably, the belt scraper is a two-part component comprising exclusively the scraper layer and the support. Optionally, the scraper layer may be adhered to the support via an adhesive. Optionally, additional attachment components may be used to secure the scraper layer to the support including rivets, pins, screws, bolts, clamps etc as will be appreciated. Preferably, the fingers are connected to one another indirectly and exclusively via the support layer.

Preferably, the support and in particular the fingers are positioned at an underside of the scraper blade closest to the belt and the scraper layer is positioned furthest from the belt relative to the support fingers. Accordingly, the scraper layer may be considered to be pulled into engaging contact with the belt surface via the support fingers. Preferably, the support fingers are biased in a direction towards the belt from a mounted position at a support beam or frame part. Preferably, the fingers extend in contact with the scraper layer along a full length of the fingers from the base to a tip of the fingers. Preferably, a full width of the scraper layer between a base end and the tip end is in contact with the fingers.

Preferably, a width of each of the fingers is generally equal to a width of each of the at least one gap region. Optionally, a width of the fingers (in a direction perpendicular to a length of the fingers between the base and the tip) is substantially uniform. Optionally, a width of the fingers may increase or decrease in a direction from the base to the tip.

Optionally, a hardness of the scraper layer is in a range 70 to 90, 75 to 85, or 78 to 82 Shore A. Optionally, a hardness of the fingers is in a range 50 Shore D to 80 Shore D, 55 Shore D to 70 Shore D, 55 Shore D to 65 Shore D. Within this specification, all reference to hardness values are stated according to international standard ASTM D2240 (measured at 23° C.+/−2° C.).

Optionally, the first and the second material comprises a polyurethane. Optionally, the first material is different to the second material. Optionally, the first material comprises a first type of polymer and the second material comprises a second type of polymer. Optionally, the first and second material comprise the same polymer having a different composition and in particular a different respective hardness and/or wear resistance.

Optionally, the fingers and the base are formed integrally. Optionally, the fingers may be formed non-integrally with the base. Preferably, the scraper layer and the support collectively represent a wear part such that the scraper blade may be replaced at a mounting beam or frame at the end of its service lifetime.

Preferably, the fingers are curved along their length between the base and a tip of the fingers. Preferably, an inside surface of the support fingers (opposed to the belt) is concave so as to be continuously curved from a base to a tip of the fingers. Accordingly and preferably, the scraper layer when mounted to extend over a rearward facing surface of the fingers is curved and preferably continuously curved in a direction from the base to the tip.

Optionally, the support may comprise two, three, four, five or six fingers. Preferably, each of the fingers is spaced apart in a widthwise direction by an equal separation distance. Preferably, a length of each of the fingers is substantially uniform.

According to a second aspect of the present invention there is provided a conveyor belt assembly to transport material between locations comprising: a drive mechanism; a belt extending around at least one drum and/or pulley, the drum and/or pulley rotatably drivable by the drive mechanism; and a scraper blade as described and claimed herein in contact with a surface of the belt.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
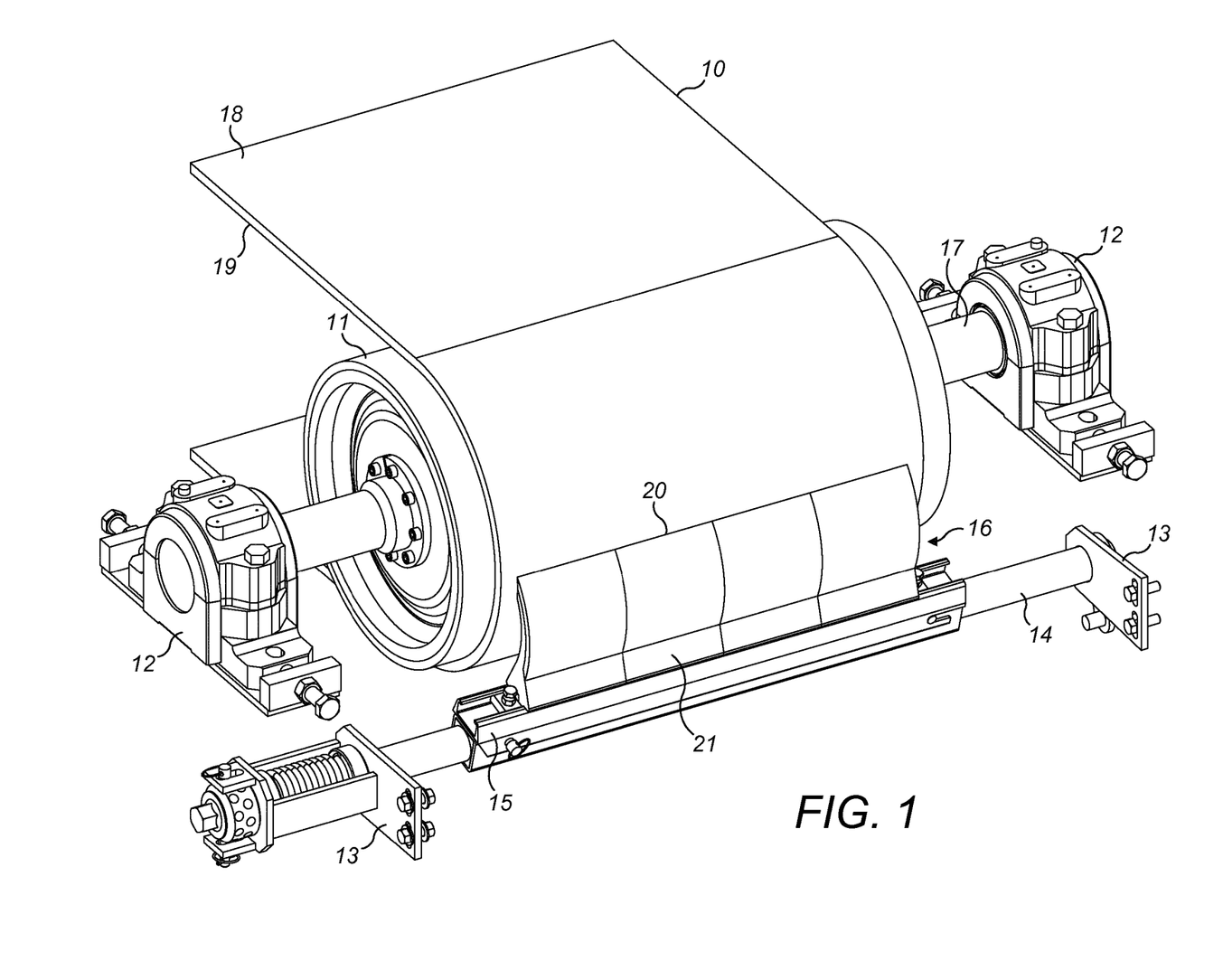
FIG. 1 is a perspective view of a conveyor having a drivable drum, a belt and a scraper positioned in contact with the belt according to a specific implementation of the present invention.
Figure 2:
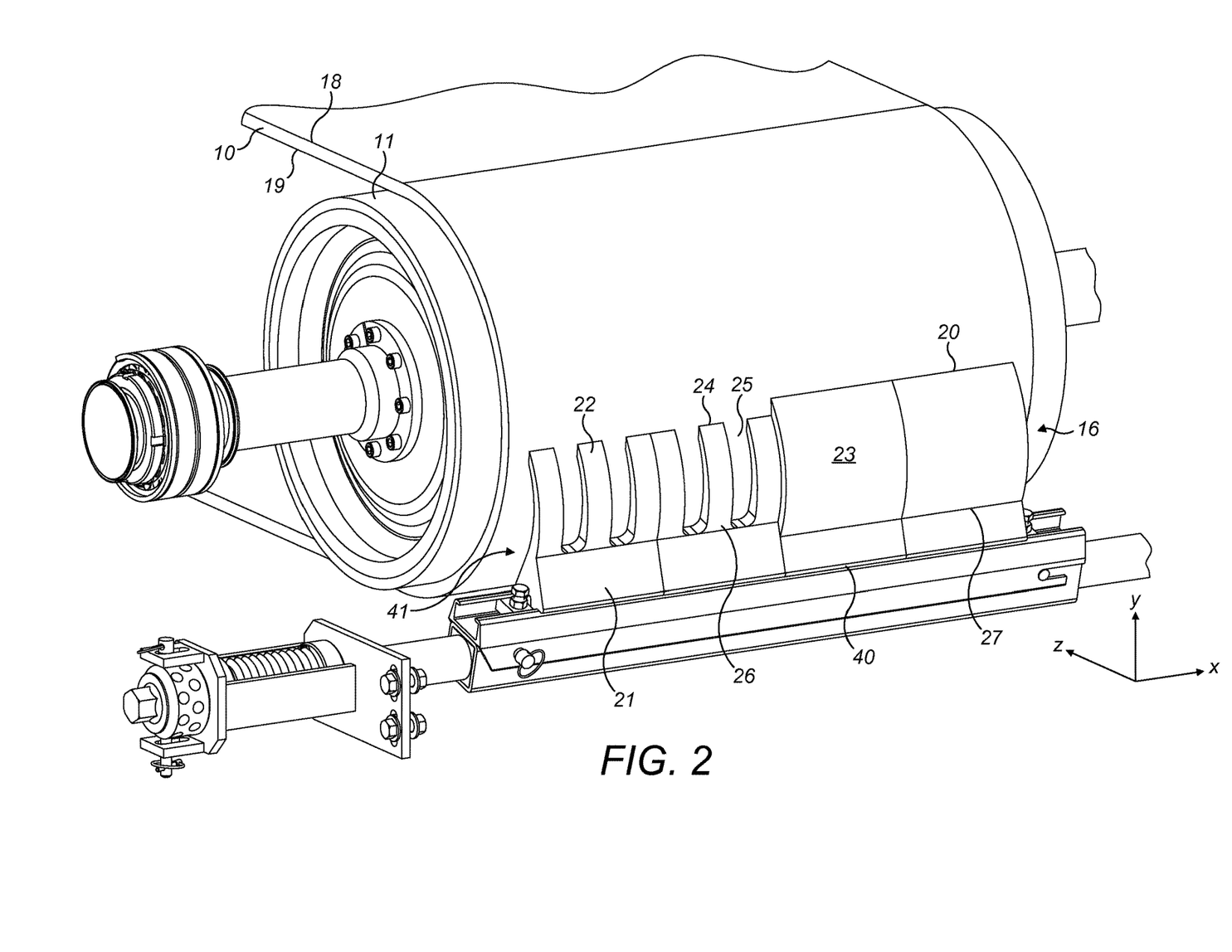
FIG. 2 is a further perspective view of the conveyor of FIG. 1 with selected components of the scraper removed for illustrative purposes.

Referring to FIGS. 1 and 2, a conveyor assembly comprises a drum 11 mounted on an elongate axle 17 drivably supported by a pair of motors 12. An endless belt 10 extends in contact with and around drum 11 via an inward facing driving surface 19. An opposed outward facing contact surface 18 of belt 10 is configured to transport bulk material between locations. A belt scraper indicated generally by reference 16 is mounted in contact with belt surface 18 at a region opposed to drum 11. Scraper 16 is mounted on a bracket 15 that is in turn mounted on an elongate support beam 14 extending between a pair of frame sides 13 so as to rigidly mount scraper 16 in contact with belt 10 as it is transported around drum 11 by motors 12.

Scraper 16, according to the specific implementation, comprises four individual scraper components or units 40 mounted on bracket 15 in a lengthwise direction along beam 14. Scraper units 40 are arranged side-by-side so as to form a continuous scraper blade extending substantially the full width of belt 10 and the majority of a length of drum 11. Each scraper unit 40 comprises a two-piece assembly including a scraper layer 23 and a support indicated generally by reference 41. Support 41 in turn comprises a base 21 from which extend three fingers 22 positioned side-by-side and separated from one another to define gap regions 25 (between the neighbouring fingers 22). Referring specifically to FIG. 2, each finger 22 comprises a length extending in the y direction having a first base end 26 (provided at the junction with base 21) and a tip end 24 positioned in near touching contact with belt contact surface 18. Each finger 22 comprises a corresponding width extending in the x direction and a corresponding thickness in the z direction. Base 21 of each support unit 41 comprises a length extending in the x direction with each of the fingers 22 spaced apart along its length. Scraper layer is secured in position over each of the fingers 22 such that fingers 22 sit intermediate scraper layer 23 and belt 10. That is, each finger 22 represents an underside region of each scraper unit 40 whilst scraper layer 23 represents a rearward facing component of each unit 40. Scraper layer 23 extends the full length of fingers 22 from the finger tips 24 to the finger bases 26. Accordingly, scraper layer 23 comprises a corresponding width extending in the y direction, a length extending in the x direction and a thickness extending in the z direction. When each of the scraper units 40 are positioned in touching contact side-by-side along the length of bracket 15, the collective scraper layers 23 form a continuous sheet material extending over and covering fingers 22. Each scraper layer 23 comprises a first end in the y direction formed as a tip 20 and a second end 27 positioned at base 21. The width of scraper layer 23 between first and second ends 20, 27 is greater than the corresponding length of each of the fingers between their respective tip and base ends 24, 26.

Figure 3:
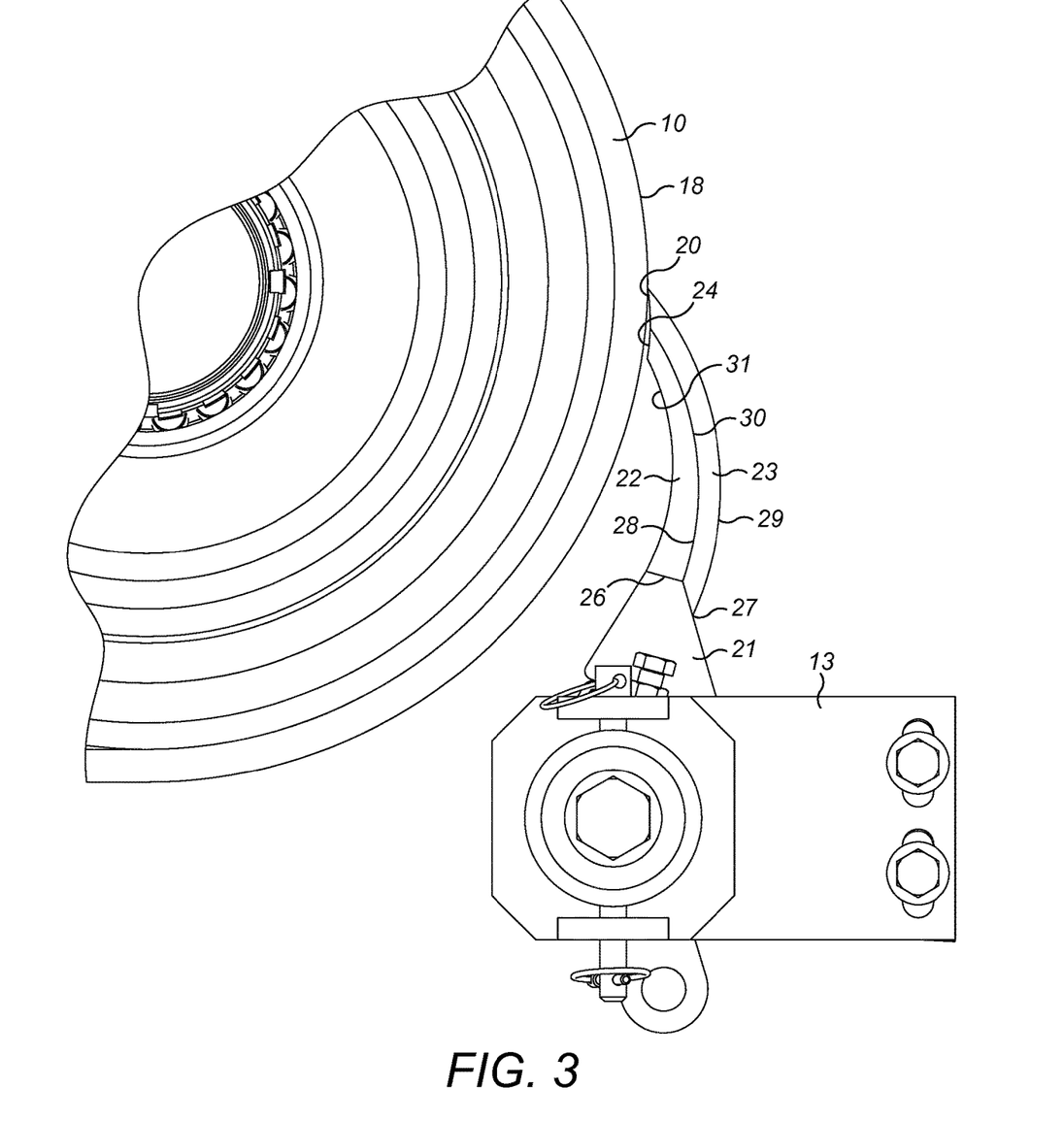
FIG. 3 is a magnified side elevation view of the drum, belt and scraper according to the specific implementation of the present invention.

Referring to FIG. 3, each cover layer 23 comprises a rearward facing surface 29 and a forward facing surface 28 provided in contact with a rearward facing surface 30 of fingers 22. Layer 23 may be secured to each finger 22 via an adhesive. According to further embodiments, layer 23 may be attached to fingers 22 via mechanical attachments such as rivets, pins, screws, bolts etc. Each of the fingers 22 comprises a forward facing surface 31 positioned opposed to belt contact surface 18.

Figure 4:
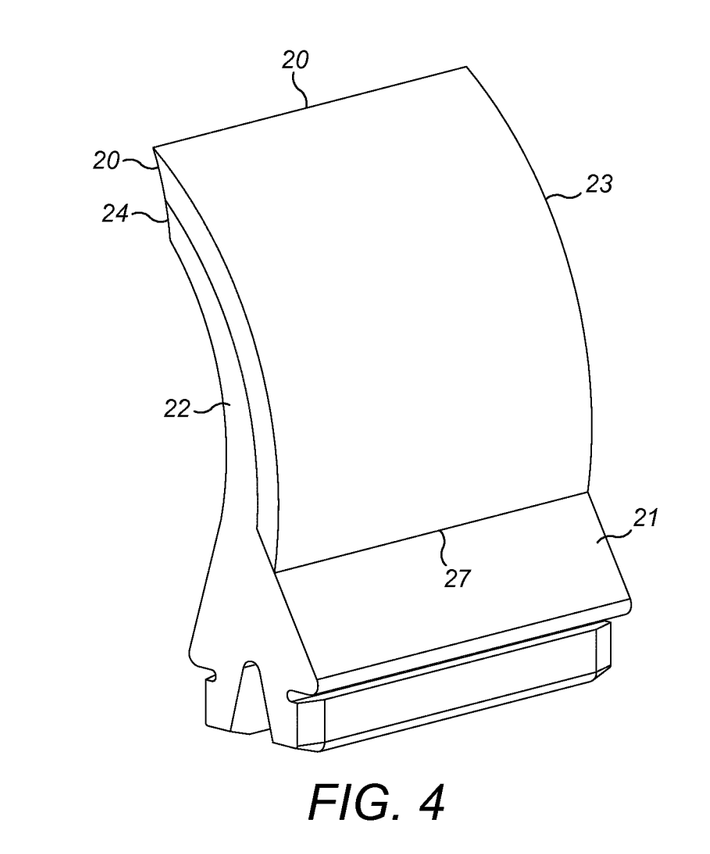
FIG. 4 is a rear perspective view of a part of the scraper of FIGS. 1 to 3.
Figure 5:
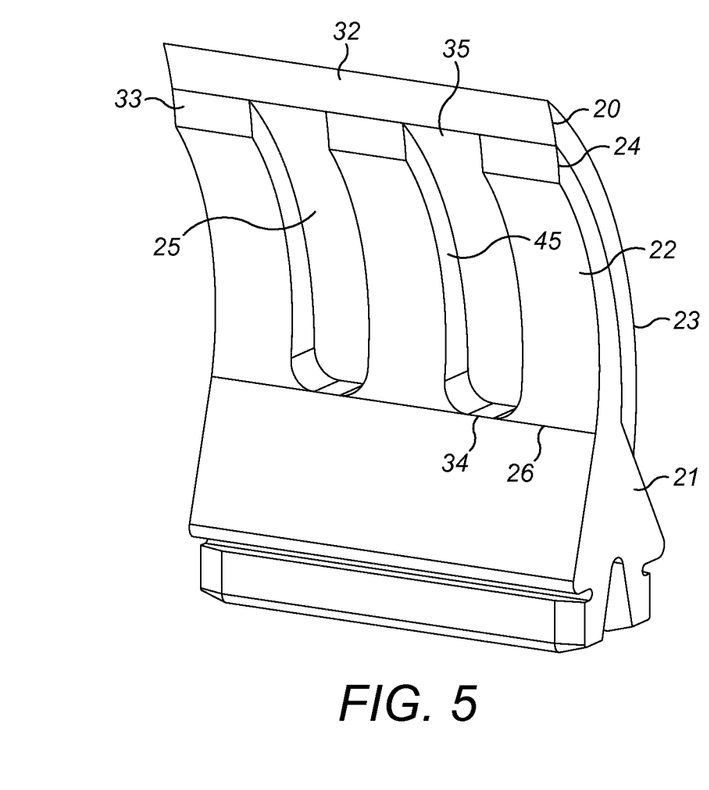
FIG. 5 is a front perspective view of the scraper part of FIG. 4.
Figure 6:
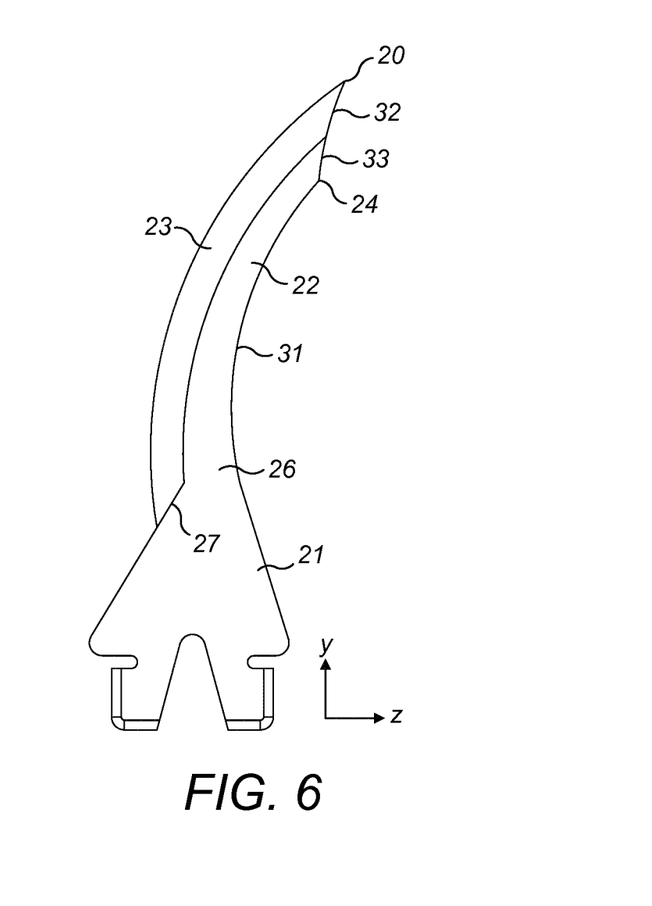
FIG. 6 is a side elevation view of the scraper part of FIG. 5.

Referring to FIGS. 4 to 6, the first (tip) end 20 of scraper layer 23 is formed as a generally planar rectangular contact surface 32. Additionally, the tip end 24 of each of the fingers 22 comprises a corresponding rectangular end surface 33 positioned almost co-planar with scraper layer surface 32. With each of the fingers 22 spaced apart in the x direction to define gap regions 25, regions of the scraper layer forward facing surface 28 are exposed between the fingers 22. Accordingly, gap regions 25 are defined by the opposed sides 45 of each finger 22 and scraper layer forward facing surface 28. Each gap region 25 comprises a first end 35 corresponding in position to the tip ends 24 of each finger 22 and a base end 34 corresponding in position to the base end 26 of each finger 22. Accordingly, each finger 22 is separated in the x direction from each neighbouring finger 22 along its full length in the y direction between ends 24, 26. Accordingly, each finger 22 is connected exclusively via base 21. In particular, the tip ends 24 of each finger 22 are not connected with one another such that the gap regions 25 extend continuously the full length of each finger 22 between gap ends 34, 35.

Referring to FIG. 6, the fingers 22 are curved in the z direction such that forward facing surface 31 is generally concave in the y direction. Accordingly, each finger tip 24 is bent inwardly towards drum 11 and belt 10 relative to each finger base 26. Such a configuration is advantageous to provide a degree of bias to urge the scraper layer 23 into contact against belt contact surface 18. In particular, the planar contact surface 32 is forced onto belt surface 18 at a transverse angle to represent a scraping or wiping tip of the scraper 16. The subject invention is advantageous via a degree of flexing in the z direction of each finger 22 dynamically in response to contours and the profile of belt surface 18. That is, should surface 18 comprise projections, for example created by damage or non-scrapable material present at surface 18, each finger 22 is independently capable of flexing in the z direction away from surface 18. Such a configuration avoids excessive pressure on belt surface 18 which would accelerate wear of the belt 10 and reduce the service lifetime of the scraper 16. The arrangement of fingers 22 extending from base 21 is advantageous in that a length portion in the x direction of each scraper unit 40 is capable of reducing the pressure contact against surface 18 whilst other regions of each scraper unit 40 are configured to maintain the continuous and desired scraping pressure at surface 18. This ensures that maximum scraping of surface 18 is achieved whilst damaged regions of belt 10 are allowed to pass under the scraper 16 with low or only modest contact pressure.

Figure 7:
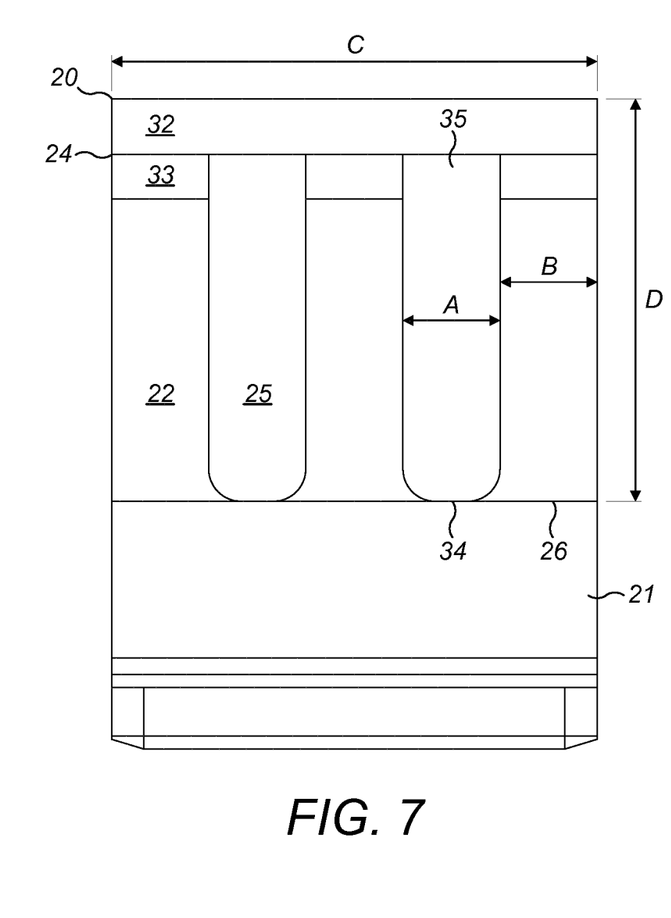
FIG. 7 is a front perspective view of the scraper part of FIG. 6.

Referring to FIG. 7, a width B in the x direction of each finger 22 is approximately equal to a corresponding width A of each gap region 25 between the fingers 22. A length D of each finger 22 between the first and second ends 24, 26 is approximately four times greater than width B. A corresponding length C of scraper layer 23 extending in the x direction is greater than the corresponding length D of each finger 22 as illustrated in FIG. 6. Also, a thickness in the z direction of each finger 22 decreases from the base end 26 to the tip end 24. At the base end 26, a thickness of each finger 22 is greater than a corresponding thickness in the z direction of scraper layer 23. However, the corresponding thickness of each finger 22 at tip end 24 is less than a corresponding thickness in the z direction of scraper layer 23 at tip 20. Such an arrangement is advantageous to ensure the extension of scraper layer 23 beyond each finger tip 24 to provide and maintain scraping contact against belt surface 18.

According to the specific implementation, fingers 22 are formed integrally with base 21 with each support unit 41 formed from a polyurethane material exhibiting low wear resistance. Preferably, the polyurethane material of fingers 22 and base 21 comprises a hardness of 50 to 70 Shore D according to international standard ASTM D2240 (measured at 23° C.). Additionally, to maximise scraping contact with belt surface 18 whilst minimising abrasive frictional damage to belt 10, scraper layer 23 comprises a polyurethane material exhibiting good wear resistance. In particular, a hardness of the polyurethane material of scraper layer 23 is less than of fingers 22 such that scraper layer 23 may be regarded as more flexible and softer than fingers 22. According to the specific implementation, scraper layer 23 comprises a hardness of 70 to 90 Shore A according to ASTM D2240 (at 23° C.). According to further specific implementations, scraper layer 23 may comprise a polymer material such as a polyethylene, polyamide, polyester or other abrasion resistant soft rubber material being relatively softer than the support fingers 22. Accordingly, the contact tip of the scraper layer 23 (formed by a region of contact surface 32) comprises a sufficient softness to achieve an improved scraping effect. The service lifetime of each scraper unit 40 is also improved as the fingers 22 allow specific regions or portions of the scraper layer tip 20 (of each unit 40) to flex away from the belt surface 18 when required. The choice of the relative hardness of the materials of scraper layer 23 and fingers 22 together with fingers 22 being cantilever mounted at each respective base 21 provides a scraper unit 40 that is optimised to be sensitive to the belt surface contour, to provide the desired cleaning effectiveness, to increase the operational lifetime of the scraper 16 and to reduce damage to the belt 10.

Figure 8:
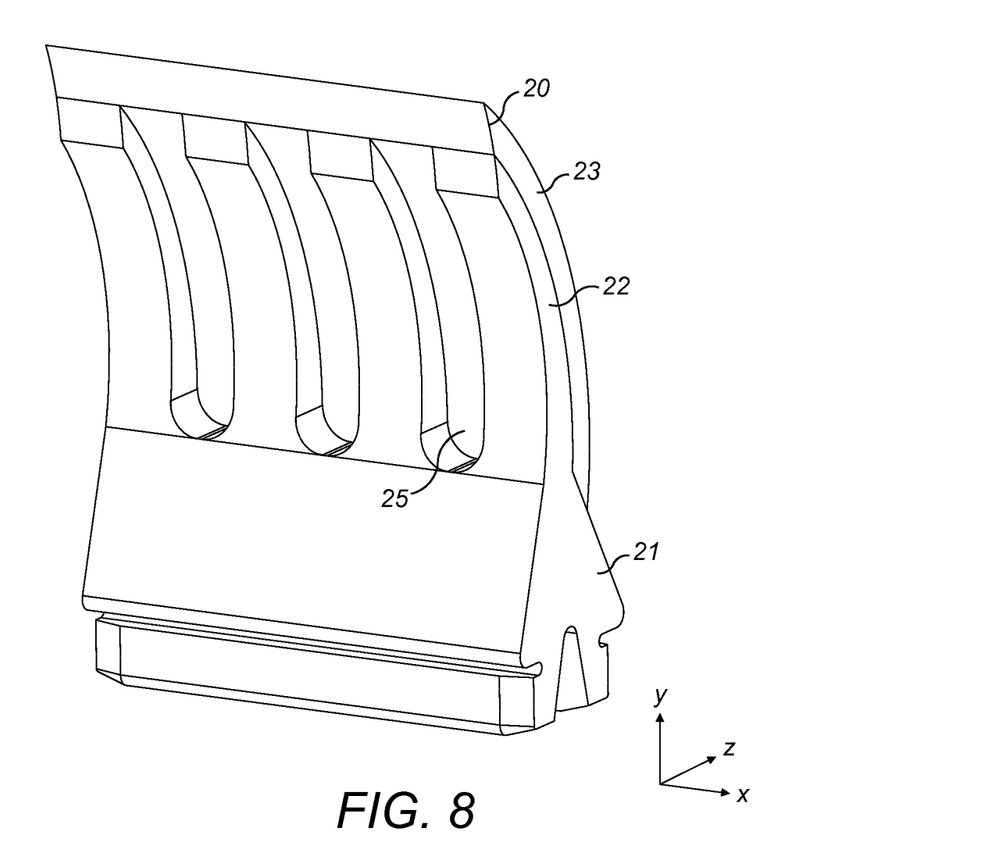
FIG. 8 is a front perspective view of part of a conveyor belt scraper according to a further specific implementation of the present invention.

A further specific implementation of the present invention is illustrated with reference to FIG. 8 and comprises four fingers 22 extending from a common base 21. Each of the fingers 22 is spaced apart in the x direction via gap regions 25 with a corresponding scraper layer 23 positioned over each of the fingers 22. The scraper unit 40 (including support 41 and scraper layer 23) according to the further embodiment of FIG. 8 comprises all the same corresponding features and dimensions described with reference to the primary embodiment of FIGS. 1 to 7.

The invention claimed is:

1. A conveyor belt scraper blade comprising:
a scraper layer having a tip arranged to contact a surface of a conveyor belt, the scraper layer having a rearward facing surface and a forward facing surface; and
a support arranged to support the scraper layer, the scraper layer being a first material and the support being a second material, the second material having a hardness greater than the first material, wherein the support includes a base and at least two fingers projecting side-by-side from the base, the fingers being spaced apart and each finger having a first surface extending in contact with the rearward facing surface of the scraper layer along an entire length of the fingers from a base to a tip of the fingers.

2. The blade as claimed in claim 1, wherein a thickness of the fingers in a plane perpendicular to the entire length of the fingers decreases from the base to the tip of the fingers.

3. The blade as claimed in claim 1, wherein a thickness of the scraper layer in a plane perpendicular to a length or width of the scraper layer is substantially uniform.

4. The blade as claimed in claim 1, wherein the fingers are spaced apart in a widthwise direction to provide at least one gap region between the fingers.

5. The blade as claimed in claim 4, wherein the fingers are spaced apart in the widthwise direction along the entire length such that the at least one gap region extends the entire length of the fingers between the base and tip of the fingers.

6. The blade as claimed in claim 4, wherein a width of each of the fingers is generally equal to a width of the at least one gap region.

7. The blade as claimed in claim 1, wherein a hardness of the scraper layer is in a range of 70 to 90 Shore A.

8. The blade as claimed in claim 1, wherein a hardness of each of the fingers is in a range of 50 Shore D to 80 Shore D.

9. The blade as claimed in claim 1, wherein the fingers and the base of the support are formed integrally.

10. The blade as claimed in claim 1, wherein the fingers are curved along the entire length between the base and tip of the fingers.

11. The blade as claimed in claim 1, wherein a full width of the scraper layer between a base end and an end of the tip of the scraper layer is in contact with the first surface of the fingers.

12. The blade as claimed in claim 1, comprising three fingers.

13. The blade as claimed in claim 1, comprising four fingers.

14. The blade as claimed in claim 1, wherein the fingers are arranged to flex in a direction away from the surface of the conveyer belt.

15. A conveyor belt assembly arranged to transport material between locations comprising:
a drive mechanism;
a conveyer belt extending around at least one drum and/or pulley, the drum and/or pulley being rotatably drivable by the drive mechanism; and
a scraper blade in contact with a surface of the conveyor belt, the scraper blade including a scraper layer having a tip arranged to contact the surface of the conveyor belt and a support arranged to support the scraper layer, the scraper layer having a rearward facing surface and a forward facing surface, the scraper layer being a first material and the support being a second material, the second material having a hardness greater than the first material, wherein the support includes a base and at least two fingers projecting side-by-side from the base, the fingers being spaced apart and each finger having a first surface extending in contact with the rearward facing surface of the scraper layer along an entire length of the fingers from a base to a tip of the fingers.

* * * * *